July 27, 1937.　　　W. KOINZAN　　　2,088,243
OIL FILTER
Filed Nov. 21, 1936　　　2 Sheets-Sheet 1

Inventor
Walter Koinzan

By Clarence A. O'Brien
Hyman Berman
Attorneys

July 27, 1937.  W. KOINZAN  2,088,243
OIL FILTER
Filed Nov. 21, 1936  2 Sheets-Sheet 2
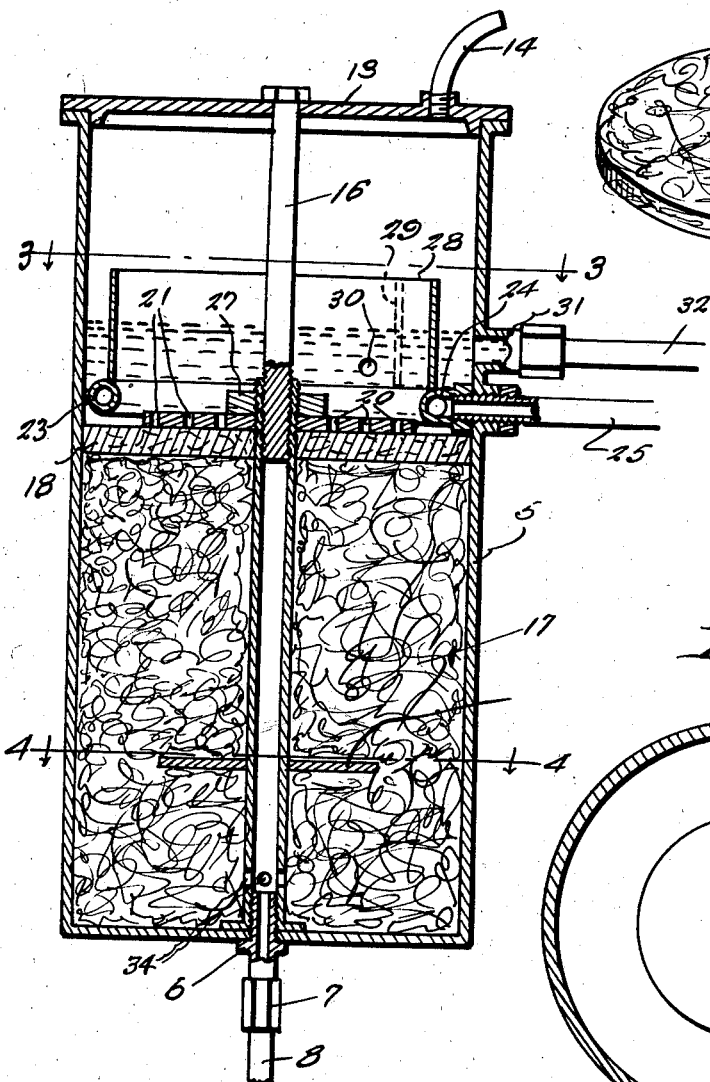
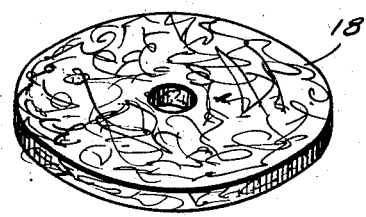
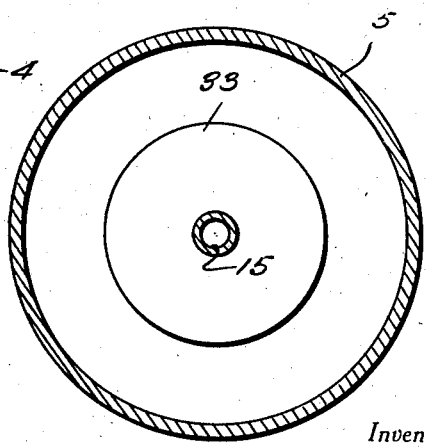
Inventor
Walter Koinzan
By Clarence A. O'Brien
Hyman Berman
Attorneys Patented July 27, 1937

2,088,243

UNITED STATES PATENT OFFICE 2,088,243

OIL FILTER

Walter Koinzan, Elgin, Nebr.

Application November 21, 1936, Serial No. 112,128

5 Claims. (Cl. 210—131)

This invention relates to oil filters and more particularly to filters of the type used on internal combustion engines for filtering the oil as it is pumped from the crankcase.

An object of the present invention is to improve generally upon such types of oil filters as are now in general use and otherwise known and the invention together with its objects and advantages will be best understood from a study of the following description taken in connection with the accompanying drawings wherein:—

Figure 2 is a vertical sectional view through the filter.

Figure 3:
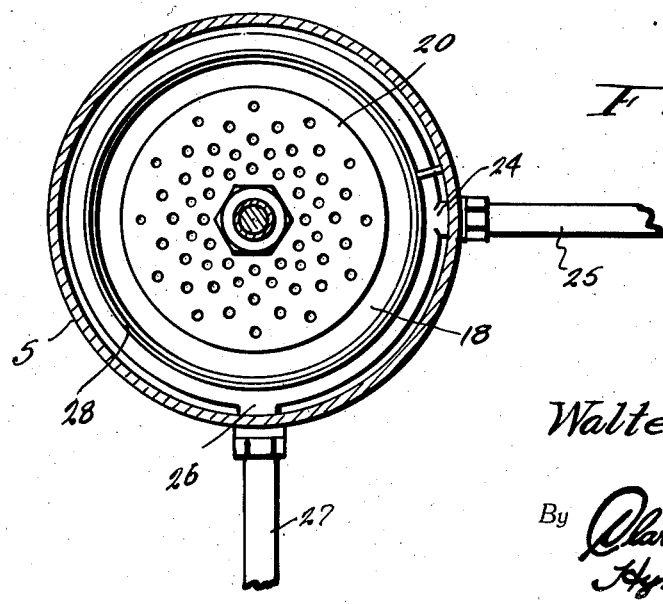

Figures 3 and 4 are horizontal transverse sectional views taken substantially on the lines 3—3 and 4—4 respectively of Figure 2 and Figure 5 is a perspective view of a disc member hereinafter more fully referred to.

Referring to the drawings by reference numerals it will be seen that in the preferred embodiment thereof the improved oil filter comprises a casing or drum 5 having tapped into the bottom thereof an inlet nipple 6 to which is coupled as at 7 one end of a feed line 8 that leads from the oil pump 10 with which the internal combustion engine, a portion of which is shown in the drawings and indicated by the reference numeral 11 is provided. Arranged in the line 8 for controlling the flow of oil pumped to the filter is a manually operated valve 12.

For the top of the casing or drum 5 there is provided a lid 13 which has tapped into it one end of a tube 14. The tube 14 will be of a length to extend forwardly to terminate at a point in proximity to the radiator fan of the internal combustion engine so that the fan may be used to produce suction in the tube 14 and in the top of the drum or casing 5 for drawing the vapor from the filter.

Arranged within the casing or drum 5 of the filter is a tube 15 that at one end is externally threaded for threaded engagement with the inner end of the oil inlet nipple 6.

At its relatively opposite upper end the tube 15 is also internally threaded for the reception of the threaded end of a bolt 16 that passes through an opening in the lid 13 and serves to secure the lid 13 in position.

Packed in the lower portion of the casing or drum 5 and about the tube 15 is a suitable filtering element 17 in the form of steel wool or other suitable material.

The filtering element 17 is confined within the casing 5 between the bottom of the casing and a disc 18 of felt or other suitable material and which is provided at its center with an opening 19 to accommodate the upper portion of the tube 15.

Resting on the felt disc 18 is a disc member 20 of smaller diameter than the disc 18 and the member 20 is perforated as at 21 through which the oil passes into the upper portion of the casing 5.

Discs 18 and 20 are held in position through the medium of a lock nut 22 threaded on the upper end of the tube 15 as clearly shown in Figure 2.

Disposed above the felt disc 18 is a heating coil 23 in the form of a circular tube that is provided with an inlet 24 to which is coupled one end of a pipe 25 leading from the exhaust manifold of the internal combustion engine. The heating tube or coil 23 is also provided with an outlet 26 to which is coupled a return pipe 27 that may lead either back to the exhaust manifold or to the atmosphere as found desirable.

Also arranged in the upper portion of the casing or drum 5 with its lower edge resting on the heating coil or tube 23 is an annulus 28 that is spaced circumferentially from the wall of the casing 5.

Extending between the member 28 and the wall of the casing 5 is a partition member 29 and at one side of the partition member 29 the member 28 is provided with an opening or port 30.

Figure 1:
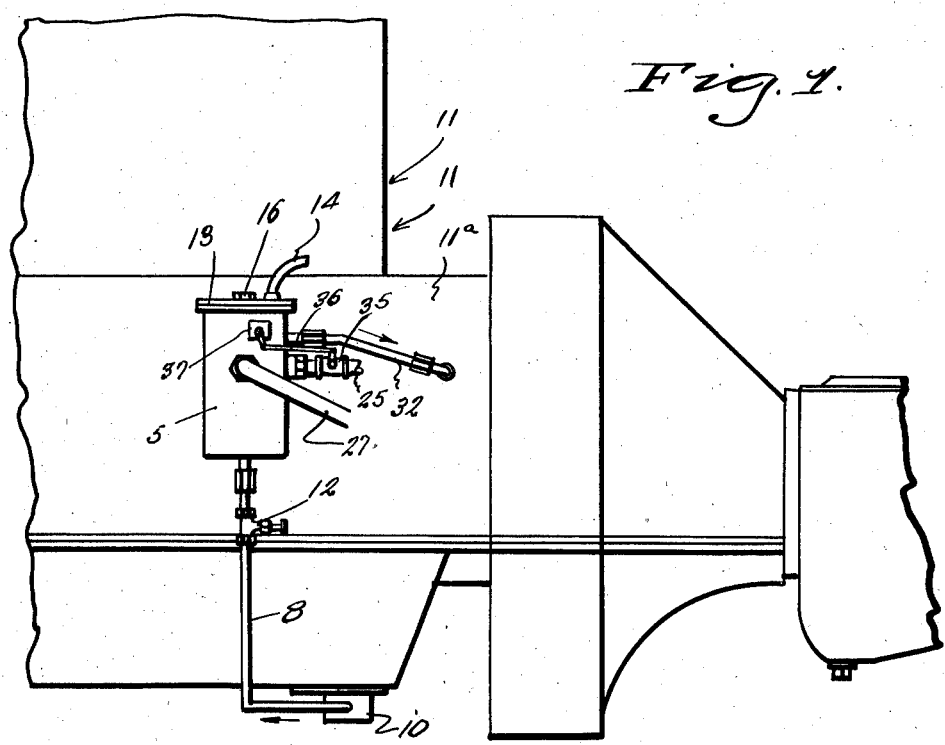
Figure 1 is a side elevational view illustrating the application of the invention to an internal combustion engine.

Also above the coil or heating tube 23 the casing 5 is provided with an oil outlet 31 to which is coupled one end of a tube 32 the other end of which is suitably tacked into the engine block 11a as shown in Figure 1 for returning the filtered oil to the crankcase.

An oil spreader 33 in the form of a flat disclike plate is provided at the center thereof with an opening to accommodate the tube 15. The plate 33 is imbedded within the filtering mass 17 and is preferably, positively secured to the tube 15 in any suitable manner.

Below the oil spreader 33 and adjacent to the inlet 6 the tube 15 is provided with a series of circumferentially spaced ports 34.

From the above, it will be seen that in actual practice the oil is pumped from the crankcase through the feed line 8 into the filter, the oil passing through the ports 34 into the filtering mass 17. As the oil passes upwardly through the mass 17 and felt 18 it is filtered and cleaned of all impurities.

In passing through the felt 18 and the perforations 21 and the disc 20 the oil enters the confines of the tube 23 and the annulus 28 where it is heated. From within the confines of the annulus 28 the oil flows through the port 30 into the space between the annulus 28 and the wall of the drum or casing 5. Due to the location of the partition 29 the oil passing into the space between the annulus 28 and the wall of the casing 5 will be caused to flow about the annulus 28 in a counter clockwise direction in order to reach the outlet 31. Thus it will be seen that the member 28 will act as a heat radiating fin with the result that the oil will be thoroughly heated prior to the passage of the same through the outlet 31 and the tube 32 back into the crankcase.

For controlling the passage of the exhaust gases from the pipe 25 through the heating coil 23 there is provided in the pipe 25 a valve 35 that is connected through the medium of suitable instrumentalities 36 with a thermostat 37 suitably mounted on the casing or drum 5 as shown in Figure 1. Thus it will be seen that when the temperature in the upper part of the drum 5 exceeds a predetermined amount thermostat 37 will operate in response to the rise of the temperature to operate the valve 35 for closing the same to cut off the flow of exhaust gases through the heating tube 23. In this connection it will be understood that normally valve 35 is in an open position.

It is thought that a clear understanding of the construction, utility and advantages of the invention will be had without a more detailed description.

Having thus described the invention, what is claimed as new is:—

1. In an oil filter for internal combustion engines, a casing having an inlet nipple in the bottom thereof, a feed line connected with said nipple, a filtering mass arranged in the lower part of the casing, a heating coil arranged in the upper part of the casing and provided with an inlet pipe extending through said casing, and said casing above said heating coil being provided with an oil outlet and a return conduit for the oil.

2. In an oil filter for internal combustion engines, a casing having an inlet nipple in the bottom thereof, an oil feed line connected to said nipple, a filtering mass in the lower part of said casing, a heating coil arranged in the upper part of said casing and provided with an inlet pipe extending through the casing, said casing above said coil being provided with an oil inlet and a return conduit for said oil, a vertical tube arranged centrally within said casing and connected at its bottom to said inlet nipple, a removable cover plate for said casing, and a retaining bolt for said plate extending therethrough and threaded into the upper end of said tube.

3. In an oil filter for internal combustion engines, a casing having an inlet nipple in the bottom thereof, an oil feed line connected to said nipple, a filtering mass arranged in the lower part of said casing, a heating coil arranged in the upper part of the casing, said casing above said heating coil being provided with an oil outlet and a return conduit for the oil, a vertical tube arranged centrally within said casing and having its bottom end connected with said nipple, a removable cover for the top of said casing, a retaining bolt for the cover having one end threaded into the upper end of said tube, and an annular member resting on and rising from said heating coil to provide a heat radiating fin for said heating coil.

4. In an oil filter for internal combustion engines, a casing having an inlet nipple in the bottom thereof, an oil feed line connected to said nipple, a filtering mass arranged in the lower part of said casing, a heating coil arranged in the upper part of the casing, means for connecting the heating coil to a heating source, said casing above said heating coil being provided with an oil outlet and a return conduit for the oil, a vertical tube arranged centrally within said casing and having its bottom end connected with said nipple, a removable cover for the top of said casing, a retaining bolt for the cover having one end threaded into the upper end of said tube, an annular member resting on and rising from said heating coil to provide a heat radiating fin for said heating coil, said annular member being circumferentially spaced from the wall of the casing, and a partition in the space between said annular member and the wall of the casing, said annular member being also provided with an opening at one side of the partition whereby the filtered oil passes from within the confines of the annular member into the space between said annular member and the wall of the casing to flow about the annular member from one side of the partition to said oil outlet whereby to insure a thorough vaporizing of the water contents of the filtered oil.

5. In an oil filter for internal combustion engines, a casing having an inlet nipple, an oil feed line connected to said nipple, a filtering mass arranged in the lower part of said casing, a heating coil arranged in the upper part of the casing and provided with a connection to a heating source, said casing above said heating coil being provided with an oil outlet and a return conduit for the oil, a vertical tube arranged centrally within said casing and having its bottom end connected with said nipple, a removable cover for the top of said casing, a retaining bolt for the cover having one end threaded into the upper end of said tube, an annular member resting on and rising from said heating coil to provide a heat radiating fin for said coil, said annular member being circumferentially spaced from the wall of the casing, a partition in the space between said annular member and the wall of the casing, said annular member being also provided with an opening at one side of the partition whereby the filtered oil passes from within the confines of the annular member into the space between said annular member and the wall of the casing to flow about the annular member from one side of the partition to said oil outlet whereby to insure a thorough vaporizing of the water contents of the filtered oil, and an oil spreading disk mounted on said tubular member adjacent the lower end thereof and imbedded within the filtering mass, said tube below the oil spreader being provided with ports through which oil passes from the tube into the mass of filtering material.

WALTER KOINZAN.